United States Patent [19]

Fremont

[11] Patent Number: 4,876,231

[45] Date of Patent: Oct. 24, 1989

[54] PROCESS FOR PREPARING CRYSTALLINE MALACHITE

[75] Inventor: Joseph M. Fremont, Glen Mills, Pa.

[73] Assignee: E. I. Du Pont de Nemours and Company, Wilmington, Del.

[21] Appl. No.: 241,263

[22] Filed: Sep. 7, 1988

[51] Int. Cl.⁴ .................... B01J 27/232; B01J 35/08
[52] U.S. Cl. ................................. 502/174; 502/9
[58] Field of Search .......................... 502/174, 9

[56] References Cited

U.S. PATENT DOCUMENTS

| | | | |
|---|---|---|---|
| 3,920,759 | 11/1975 | Hort | 502/154 |
| 4,107,082 | 8/1978 | Freemont | 502/174 |
| 4,110,249 | 8/1978 | Freemont | 502/9 |
| 4,536,491 | 8/1985 | Freemont | 502/174 |
| 4,584,418 | 4/1986 | Freemont | 568/855 |

*Primary Examiner*—Paul E. Konopka
*Attorney, Agent, or Firm*—Charles E. Feeny

[57] ABSTRACT

An improved three stage process for preparing agglomerates of spheroidal masses of malachite crystals in which the formation of pH gradients during addition of ingredients to the third stage is avoided.

6 Claims, No Drawings

PROCESS FOR PREPARING CRYSTALLINE MALACHITE

BACKGROUND OF THE INVENTION

The present invention relates to an improvement in a process for preparing basic copper carbonate (malachite), and, more particularly, to an improvement in a process for preparing agglomerates of spheroidal malachite crystals on a commercial scale.

1,4-butynediol is made according to one commercial process by reacting acetylene with formaldehyde using a copper acetylide catalyst as described in more detail in U.S. Pat. No. 4,110,249. The catalyst is described therein as being made by reacting malachite, in the form of spheroidal crystals containing bismuth oxy-compounds to suppress cuprene formation, with acetylene and formaldehyde.

U.S. Pat. Nos. 4,536,491 and 4,584,418 describe the addition of silicic acid to the malachite preparation which results in an improved agglomerated form of spheroidal malachite crystals leading to copper acetylide catalyst which filters easily and is more active. Consistently good results had been obtained on a laboratory scale using this technology, but major difficulties were encountered in trying to implement the technology to make agglomerated spheroidal malachite crystals on a large commercial scale, e.g., activity of the resulting catalyst was low, spheroidal crystals could not be consistently reproduced, and the silicic acid in the solution of the copper and bismuth salts tended to polymerize or separate and thereby become less effective if not consumed within a short time of preparation.

SUMMARY OF THE INVENTION

The present invention is an improvement in a process for preparing agglomerates of spheroidal masses of malachite crystals which comprise 1-7%, by weight, of bismuth oxycarbonate and 0.5-3.5%, by weight (calculated as $SiO_2$) of a silicic acid from the reaction of a copper salt, a bismuth salt and silicic acid with a carbonate or a bicarbonate. The process comprises:

(a) forming amorphous gel-like hydrated copper carbonate by bringing together, in aqueous solution, with agitation, at a temperature of about 45°–55° C., and at a pH of 5.5–7.5, about 30–60% by volume of the total amounts of the starting materials comprising the copper salt, the bismuth salt, the silicic acid and the carbonate or bicarbonate required to form the malachite and to provide the specified amounts of bismuth oxycarbonate and silicic acid;

(b) holding the mass of (a), without agitation, at a temperature of about 45°–55° C. until a slurry comprising masses of malachite crystals forms; and then (c) adding the remaining starting materials at a temperature of 45°–55° C., and a pH of 5.5–7.5, with agitation, to form the agglomerates.

The improvement comprises, on a commercial scale:

(1) substituting an alkali metal silicate for silicic acid in step (a), and dividing the starting materials into a first ingredient stream comprising a mixture of the alkali metal silicate and the carbonate or the bicarbonate, and a second ingredient stream comprising the copper salt and the bismuth salt; and (2) in step (c), adding the remaining starting materials to the slurry of step (b) by first mixing the ingredient streams at a pH of 5.5–7.5 and then adding the mixture to the slurry.

In a preferred embodiment of the invention, the ingredient streams of the remaining 70 to 40% of reactants solutions to be added to the slurry prepared in step (b) are mixed by passing them simultaneously through a static mixing device such that the pH of the resulting mixture reaches a value in the range of 5.5–7.5, and, more preferably, the pH of the resulting mixture reaches a value which is equal to the pH of the slurry.

Mixing the ingredient streams prior to adding them to the slurry of step (b) so that the pH of the mixture is within the pH range of the slurry, and preferrably equal to the pH of the slurry, eliminates the formation of alternating zones of high and low pH within the reaction medium. Alternating zones of high and low pH, such as occur when the respective starting materials are added to the slurry of step (b) separately, cause partial dissolution and reprecipitation of the malachite crystals already formed. These "reprecipitated" crystals then agglomerate somewhat uncontrollably into a structure which, although convertible into a copper acetylide catalyst, produces a catalyst having low activity and reduced life.

In practice, mixing the ingredient streams and adjusting the pH to the desired value can be accomplished almost simultaneously, as, for example, by passing the starting materials simultaneously through an inline mixer immediately prior to discharging the resulting mixture into the slurry.

The improvement eliminates separate ingredient feed streams and undesirable pH gradients within the reaction medium.

DETAILED DESCRIPTION OF THE INVENTION

The preparation of agglomerates of spheroidal masses of malachite crystals which are useful for preparing copper acetylide catalysts is described in U.S. Pat. No. 4,536,491, the teachings of which are incorporated herein by reference. The preparation comprises a three-stage process in the first stage of which an amorphous gel-like hydrated copper carbonate is prepared by bringing together, with agitation in aqueous solution, starting materials comprising a cupric salt, a bismuth salt, an alkali metal carbonate or an alkali metal bicarbonate, and silicic acid. Only 30-60%, by volume, of the total amount of the cupric salt, the bismuth salt, the silicic acid and the carbonate or bicarbonate needed for the preparation is used in the first stage as determined by precalculation. After 30-60% of the solutions have been added, the feeds are stopped, and a small amount of malachite seed crystals are added. Agitation is continued for about 30 seconds more and is then stopped. Conversion to malachite spheres occurs in about 15-60 minutes which completes the second stage of the reaction. The balance of the starting materials required are added during the third stage of the preparation.

According to the above-described method, the silicic acid can be preformed by mixing together about 100 parts by volume of water, about 10 parts by weight of sodium silicate and about 10 parts by weight nitric acid, with stirring. This gives a colloidal suspension of silicic acid which can be used together with the other starting materials in preparing the malachite. Catalysts prepared from such laboratory-scale malachite crystals achieved high catalyst activity.

It has now been found during commercial scale-up, however, that a suspension of silicic acid in in the copper and bismuth salt solutions, prepared for use as described in U.S. Pat. No. 4,536,491, is not storage stable. It tends to polymerize or separate if not consumed soon after preparation, which is not always possible on commercial scale-up.

According to the invention, an alkali metal silicate, preferably sodium silicate is used in place of silicic acid, and the starting materials are divided into a first ingredient stream comprising a mixture of the alkali metal silicate and the carbonate or the bicarbonate, and a second ingredient stream comprising the copper salt and the bismuth salt. Precalculated amounts of these two ingredient streams are then brought together as the first stage of the preparation. In addition, the balance of the starting materials of cupric salt and bismuth salt from the first stage which are to be added to the reaction medium from the second stage are first premixed with the alkali metal silicate and the carbonate or bicarbonate until the pH of the mixture is adjusted to a value in the range of 5.5 to 7.5, preferably to a value of 6.5 to 7.0, which is equal to or nearly equal to the pH of the reaction medium from the second stage. The mixture is then added to the reaction medium from the second stage with agitation which forms the desired agglomerates of spheroidal masses of malachite crystals because pH gradients are avoided.

Any water soluble cupric salt can be used, such as, for example, the nitrate, the chloride and the sulfate. Cupric nitrate is preferred.

Similarly, any water soluble bismuth salt can be used, such as, for example, the nitrate, the oxy-carbonate, the citrate, the sulfate and the phosphate. The nitrate is preferred.

Of the alkali metal carbonates and bicarbonates which can be used, sodium carbonate and sodium bicarbonate are preferred.

Of the alkali metal silicates which can be used, sodium silicate is preferred.

Each salt solution is prepared so that it contains as much salt as possible without crystallizing from solution on standing or during use.

In practice, the ingredient stream comprising the copper salt solution and the bismuth salt solution is brought together with the ingredient stream comprising the carbonate or the bicarbonate and the alkali metal silicate in such proportions that the resulting mixture contains 1–10%, by weight, of its copper content of bismuth salt, and 0.1–2%, by weight, of alkali metal silicate, and the reaction medium has a pH in the range of 5.5–7.5, preferably 6.5–7.0. An amorphous mass of gel-like hydrated copper carbonate forms immediately.

The resulting mixture of salts is held at a temperature of 45°–55° C., with stirring. At this point, after the individual feeds have stopped, a small amount, e.g., 0.1 to 1.0 parts by weight, of malachite seed crystals are added, and agitation is continued for about 30 seconds and then stopped.

In a preferred embodiment of this invention, the amorphous gel-like hydrated copper carbonate is formed by bringing together simultaneously a first ingredient stream comprising an alkali metal carbonate or bicarbonate solution which contains an alkali metal silicate, such as sodium silicate, as an additive in place of silicic acid, and a second ingredient stream which comprises a copper salt aqueous solution which contains a bismuth salt as an additive. The ingredient streams are brought together in a small amount of water. The first ingredient stream containing the carbonate or bicarbonate is added at such a rate that the pH of the reaction medium is maintained at about 5.5–7.5, preferably 6.5–7.0. Malachite seed crystals are then added, and stirring is continued for about another 30 seconds after which agitation is stopped.

In the second stage, the product of the first stage is held at a temperature of 45°–55° C., without stirring or agitation of any kind. Carbon dioxide evolves, and masses of malachite crystals form. Crystal formation is ordinarily complete in 15–60 minutes.

In the third stage, the reaction medium from the second stage, which contains masses of malachite crystals, is stirred and held at a temperature of 45°–55° C. while the remainder of the starting materials to be used are added.

In practice, the remaining acidic copper salt solution from the first stage, which contains the bismuth salt as an additive, and the remaining basic carbonate or bicarbonate solution which contains the alkali metal silicate are premixed in proportions which achieve the desired pH. Premixing can be accomplished by any convenient means, such as, for example, by passing each solution, i.e., ingredient stream, simultaneously through an inline mixing device, such as, for example, a "Lightnin" Type 22 turbulent inline static mixer available from Mixing Equipment Co., Inc, Rochester, N.Y. The premixed streams thus form amorphous gel-like copper carbonate as they are being fed to the reaction medium from the second stage. The pH of the premixed ingredient streams being fed to the reaction medium simultaneously can be controlled and maintained using flow meters for each of the two (or more) streams being premixed while simultaneously monitoring the pH of the reaction medium.

Since the premixed ingredient stream and the reaction medium from the second stage are at about the same pH of about 7.0 or slightly below, i.e., a pH range in which the spheroidal malachite crystals are most stable, there is practically no effect on the malachite crystals already formed. In addition, the newly formed amorphous copper carbonate being added has an ideal environment in which to crystallize to the desired agglomerates of spheroidal malachite. There are no pH gradients within the reaction mass to cause malformed crystalline entities.

The resulting agglomerates of spheroidal malachite crystals are filtered from the reaction medium and washed free of residual salts with water.

Premixing the ingredient streams to achieve a pH which coincides with the pH of the reaction medium of the second stage is critically important in practicing the three-stage process on a commercial scale. The improvement of this invention avoids alternating zones of unequal pH being created in the third and final stage of the preparation which, in turn, can adversely affect the structure of the spheroidal malachite crystal agglomerates and the activity of the copper acetylide catalyst made therefrom. The improvement of this invention also eliminates the problems caused by polymerized silicic acid solution which occurred during commercial scale-up.

The malachite prepared according to the improved process of this invention is especially suited for conversion to a copper acetylide complex which can be used directly as a catalyst for the reaction of acetylene and formaldehyde to produce 1,4-butynediol.

In the following Example, all parts are by weight.

EXAMPLE

A copper nitrate solution was prepared by dissolving 980 parts of $Cu(NO_3)_2 \cdot H_2O$ with 35 parts of $Bi(NO_3)_3 \cdot 5H_2O$ and 90 parts concentrated $HNO_3$ in 900 parts of water in a commercial reactor. A sodium carbonate solution consisting of 675 parts anhydrous $Na_2CO_3$ in 3300 parts of water with 10 parts of sodium silicate solution was used for neutralization and precipitation of copper solution. The precipitation was conducted in a 10 liter glass vessel equipped with baffles, an agitator, a thermometer and a pH electrode for pH control. 3300 parts of water were added to the precipitation vessel, and the vessel was heated to a temperature of 45°–50° C. with agitation and the sodium carbonate solution was fed simultaneously with the copper nitrate solution to maintain a pH of 6.5–7.0. Feed rates were such that 30–60% of the copper nitrate solution was fed to the reactor in about 15 minutes. At this point the feeds were stopped and 0.1 parts of malachite seed crystals were added and stirred for 30 seconds after which agitation was stopped. The glass vessel at this point contained a bluish green gel. After 15 to 60 minutes the gel had completely converted to green spherical malachite crystals which settled to the bottom of the vessel. The malachite crystals were from 3 to 4 microns in diameter.

Agitation was then restarted, and the remaining copper nitrate solution and sodium carbonate solution were added to the reactor over a period of about 15–20 minutes and at a temperature of about 45°–50° C. The addition was accomplished by pumping the copper nitrate solution and sodium carbonate solution simultaneously through an inline static mixing device so that the mixed stream achieved a pH of 6.5–7.0 immediately prior to or simultaneously with being introduced into the reactor so that any possibility of a pH gradient occurring between the reaction mass in the reactor and the mixed stream being added was avoided. The material produced was an agglomerated malachite crystal complex about 15–17 microns in diameter consisting of individual spheres about 6 microns in diameter. The material was filtered, washed, and dried and yielded about 450 parts of agglomerated malachite crystals.

I claim:

1. In a process for preparing agglomerates of spheroidal masses of malachite crystals, which crystals comprise 1–7%, by weight, of bismuth oxycarbonate and 0.5–3.5%, by weight (calculated as $SiO_2$), of silicic acid from a copper salt, a bismuth salt, and silicic acid, in which the process comprises:
   (a) forming amorphous gel-like hydrated copper carbonate by bringing together, in aqueous solution, with agitation, at a temperature of about 45°–55° C. and at a pH of 5.5–7.5, maintained with an alkali metal carbonate or an alkali metal bicarbonate, about 30–60% by volume of the total amount of the copper salt, the bismuth salt and the silicic acid required to form the malachite and to provide the specified amounts of bismuth oxycarbonate and silicic acid;
   (b) holding the mass of (a) without agitation at a temperature of about 45°–55° C. until masses of malachite crystals form; and then
   (c) maintaining the resulting slurry at a temperature of 45°–55° C. and at a pH of 5.5–7.5 with an alkali metal carbonate or an alkali metal bicarbonate while adding, with agitation, the remainder of the required amount of copper salt, bismuth salt and salicic acid to form the agglomerates, the improvement comprising:
   (1) substituting an alkali metal silicate for silicic acid in step (a), and dividing the starting materials into a first ingredient stream comprising a mixture of the alkali metal silicate and the carbonate or the bicarbonate, and a second ingredient stream comprising the copper salt and the bismuth salt; and
   (2) in step (c), adding the remaining starting materials to the slurry of step (b) by first mixing the ingredient streams to achieve a pH in the range of 5.5–7.5 and then adding the mixture to the slurry.

2. The process of claim 1 in which, in step (c), the ingredient streams are mixed by passing them simultaneously through a static mixing device.

3. The process of claim 2 in which the mixing device is an inline static mixer.

4. The process of any one of claims 1–3 in which the mixing is accomplished immediately prior to or simultaneously with addition of the mixture to the slurry.

5. The process of claim 1 in which the alkali metal silicate is sodium silicate.

6. The process of claim 5 in which the first ingredient stream comprises sodium silicate and sodium carbonate, and the second ingredient stream comprises cupric nitrate and bismuth nitrate.

* * * * *